US012802243B2

(12) United States Patent
Araújo et al.

(10) Patent No.: US 12,802,243 B2
(45) Date of Patent: Nov. 17, 2026

(54) ALIGNING REPRESENTATIONS OF 3D SPACE

(71) Applicant: Telefonaktiebolaget LM Ericsson (publ), Stockholm (SE)

(72) Inventors: José Araújo, Stockholm (SE); Paula Carbó Cubero, Sundbyberg (SE); Lars Andersson, Solna (SE); Ioannis Karagiannis, Kalamata (GR); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 18/026,472

(22) PCT Filed: Sep. 29, 2020

(86) PCT No.: PCT/EP2020/077233

§ 371 (c)(1),
(2) Date: Apr. 7, 2023

(87) PCT Pub. No.: WO2022/069023

PCT Pub. Date: Apr. 7, 2022

(65) Prior Publication Data

US 2023/0360237 A1 Nov. 9, 2023

(51) Int. Cl.

*G06T 7/30* (2017.01)
*G06T 7/70* (2017.01)
*G06T 17/05* (2011.01)

(52) U.S. Cl.

CPC .................. *G06T 7/30* (2017.01); *G06T 7/70* (2017.01); *G06T 17/05* (2013.01); *G06T 2207/10028* (2013.01); *G06T 2207/30252* (2013.01)

(58) Field of Classification Search

CPC . G06T 2207/10028; G06T 17/00; G06T 7/73; G06T 7/55; G06T 7/70; G06T 7/80;
(Continued)

(56) References Cited

U.S. PATENT DOCUMENTS

2009/0232355 A1* 9/2009 Minear ..................... G06T 7/35 382/103
2016/0212411 A1* 7/2016 Lindner .................. G06T 7/593
2020/0035020 A1* 1/2020 Price ......................... G06T 5/50

OTHER PUBLICATIONS

International Search Report and Written Opinion of the International Searching Authority, PCT/EP2020/077233, mailed Jul. 1, 2021, 17 pages.

(Continued)

*Primary Examiner* — Xiao M Wu
*Assistant Examiner* — Scott E Sonners
(74) *Attorney, Agent, or Firm* — Sage Patent Group

(57) ABSTRACT

A method for aligning representations of a 3D space is provided, including: obtaining a first set of geometric restrictions for a first representation corresponding to capturing restrictions of a first capturing device, the first representation forming part of a map for positioning of capturing devices; obtaining a second set of geometric restrictions corresponding to capturing restrictions of a second capturing device for providing a second representation of a 3D physical space; determining that a difference between the first set of geometric restrictions and the second set of geometric restrictions exceeds a threshold; determining which one of the first set of geometric restrictions and the second set of geometric restrictions is most restrictive and which one is least restrictive; and triggering a restrictive determination of the representation that is based on the least restrictive set of geometric restrictions, the determination being based on the most restrictive set of geometric restrictions.

15 Claims, 4 Drawing Sheets

(58) Field of Classification Search
CPC . G06T 2207/10016; G06T 2207/30252; G06T 2200/08; G06T 7/97; G06T 2207/20221; G06T 7/85; G06T 2207/30244; G06T 7/30; G06T 7/344; G06T 15/20; G06T 7/251; G06T 5/80; G06T 7/174; G06T 15/205; G06T 15/00; G06T 2207/30248; G06T 2207/30232; G06T 2207/20212; G06T 7/292; G06T 1/0007; G06T 7/38; G06T 7/596; G06T 2207/10; H04N 23/90; H04N 13/282
See application file for complete search history.

(56) References Cited

OTHER PUBLICATIONS

Eckart, Benjamin et al., "EOE: Expected Overlap Estimation over Unstructured Point Cloud Data," 2018 International Conference on 3D Vision, IEEE, Sep. 5, 2019, 9 pages.
Boroson, Elizabeth R. et al., "3D Keypoint Repeatability for Heterogeneous Multi-Robot SLAM," 2019 International Conference on Robotics and Automation (ICRA), IEEE, Montreal, Canada, May 20-24, 2019, 7 pages.
Dube, Renaud et al., "Incremental-Segment-Based Localization in 3-D Point Clouds," IEEE Robotics and Automation Letters, vol. 3, No. 3, Jul. 1, 2018, 8 pages.
European Office Action European Patent Application No. 20785715.2, mailed Aug. 26, 2025, 7 pages.

* cited by examiner

ALIGNING REPRESENTATIONS OF 3D SPACE

CROSS REFERENCE TO RELATED APPLICATIONS

This application is a 35 U.S.C. § 371 national stage application of PCT International Application No. PCT/EP2020/077233 filed on Sep. 29, 2020, the disclosure and content of which is incorporated by reference herein in its entirety.

TECHNICAL FIELD

The present disclosure relates to the field of enabling localisation of a second capturing device using a map based on data of a first capturing device, and in particular to aligning representations of a 3D (three-dimensional) space between the map and the second capturing device.

BACKGROUND

Localisation and mapping are used for many types of mobile devices, such as self-driving cars, unmanned aerial vehicles, robots, as well as for augmented reality (AR) and virtual reality (VR) devices. Localisation is the process of determining the pose of a device/object in space, where pose is defined as the combination of position and orientation. Mapping is the process of mapping the real world in a data structure.

Performance of localisation and mapping for mobile devices can be enhanced by merging structural (visual and/or depth-related) information from electronic capturing devices e.g. cameras, lidar, etc., and motion information from Inertial Measurement Units (IMUs). In this way, the mobile device is able to acquire six degrees of freedom movements of the mobile device (rotation and translation).

The localisation is based on a localisation map comprising representations of the physical space. The representation can be the result of processing of the raw structural data from a mobile device comprising one or more capturing devices. The representation can e.g. comprise segments representing sections of the physical space and/or features representing distinguishable geometric structures in the physical space. The localisation is performed when captured data is processed and compared with the data in the localisation map.

When both localisation and mapping is combined, i.e. learning an area while keeping track of a pose of a capturing device within it, this is known as Simultaneous Localisation and Mapping, or SLAM.

Examples of the application of SLAM are Google ARKit, Apple ARCore and the Microsoft Hololens AR HMD. These frameworks use computer vision to give devices (smartphones and tablets at the moment) the ability to determine their pose relative to the world around them.

One way of mapping and localisation is based on segments, e.g. as described in Dubé et al "Incremental Segment-based Localization in 3D Point Clouds", IEEE Robotics and Automation Letters (Volume: 3, Issue: 3, July 2018), page 1832-1839.

In SLAM, the capturing device to be localised might be of different hardware characteristics than the capturing device that provided data for mapping. Such localisation performs much worse than when the hardware characteristics match between the capturing devices.

SUMMARY

One object is to improve localisation when different capturing devices are used for mapping and localisation.

According to a first aspect, it is provided a method for aligning representations of a three-dimensional, 3D, space. The method is performed in an alignment device and comprises the steps of: obtaining a first set of geometric restrictions for a first representation of a 3D physical space, the first set of geometric restrictions corresponding to capturing restrictions of a first capturing device, the first representation forming part of a map for positioning of capturing devices; obtaining a second set of geometric restrictions, the second set of geometric restrictions corresponding to capturing restrictions of a second capturing device for providing a second representation of a 3D physical space for positioning the second capturing device using the map; determining that a difference between the first set of geometric restrictions and the second set of geometric restrictions exceeds a threshold amount; determining which one of the first set of geometric restrictions and the second set of geometric restrictions is most restrictive and which one is least restrictive; and triggering a restrictive determination of the representation that is based on the least restrictive set of geometric restrictions, the determination being based on the most restrictive set of geometric restrictions.

The step of triggering a restrictive determination may comprise performing the restrictive determination.

The step of triggering restrictive determination may comprise the sub-steps of: obtaining a 3D data structure corresponding to the least restrictive set of geometric restrictions; and applying a filter corresponding to the most restrictive set of geometric restrictions to the 3D data structure.

The step of triggering restrictive determination may comprise the sub-step of: performing incremental segmentation based on the filtered 3D data structure.

The step of triggering restrictive determination may comprise, when the first set of geometric restrictions is determined to be the least restrictive and the second set of geometric restrictions is determined to be the most restrictive, selecting from a plurality of sub-representations of the first set of geometric representation, a sub-representation that is based on a set of geometric restrictions that most closely matches the second set of geometric representations.

The step of triggering a restrictive determination may comprise performing the restrictive determination only for data, within a 3D data structure, that is within a threshold distance of an estimated position of the second capturing device.

The step of triggering restrictive determination may comprise performing the restrictive determination for a plurality of different ways of applying the most restrictive set of geometric restrictions.

The plurality of different ways of applying the set of most restrictive set of geometric restrictions may be mutually exclusive.

The plurality of different ways of applying the most restrictive set of geometric restrictions may overlap.

The method may further comprise the step of: storing a result of the restrictive determination in the map.

Each one or the first representation and the second representation may comprise a plurality of 3D segments, each 3D segment comprising centroid coordinates and a descriptor defining extension of the 3D segment around the centroid.

The first set of geometric restrictions and the second set of geometric restrictions may comprise restrictions based on field of view.

The first set of geometric restrictions and the second set of geometric restrictions may comprise restrictions based on a vertical range.

According to a second aspect, it is provided an alignment device for aligning representations of a three-dimensional, 3D, space. The alignment device comprises: a processor; and a memory storing instructions that, when executed by the processor, cause the alignment device to: obtain a first set of geometric restrictions for a first representation of a 3D physical space, the first set of geometric restrictions corresponding to capturing restrictions of a first capturing device, the first representation forming part of a map for positioning of capturing devices; obtain a second set of geometric restrictions, the second set of geometric restrictions corresponding to capturing restrictions of a second capturing device for providing a second representation of a 3D physical space for positioning the second capturing device using the map; determine that a difference between the first set of geometric restrictions and the second set of geometric restrictions exceeds a threshold amount; determine which one of the first set of geometric restrictions and the second set of geometric restrictions is most restrictive and which one is least restrictive; and trigger a restrictive determination of the representation that is based on the least restrictive set of geometric restrictions, the determination being based on the most restrictive set of geometric restrictions.

The instructions to trigger a restrictive determination may comprise instructions that, when executed by the processor, cause the alignment device (1) to performing the restrictive determination.

The instructions to trigger restrictive determination may comprise instructions that, when executed by the processor, cause the alignment device to: obtain a 3D data structure corresponding to the least restrictive set of geometric restrictions; and apply a filter corresponding to the most restrictive set of geometric restrictions to the 3D data structure.

The instructions to trigger restrictive determination may comprise instructions that, when executed by the processor, cause the alignment device to: perform incremental segmentation based on the filtered 3D data structure.

The instructions to trigger restrictive determination may comprise instructions that, when executed by the processor, cause the alignment device to, when the first set of geometric restrictions is determined to be the least restrictive and the second set of geometric restrictions is determined to be the most restrictive, select from a plurality of sub-representations of the first set of geometric representation, a sub-representation that is based on a set of geometric restrictions that most closely matches the second set of geometric representations.

The instructions to trigger a restrictive determination may comprise instructions that, when executed by the processor, cause the alignment device to perform the restrictive determination only for data, within a 3D data structure, that is within a threshold distance of an estimated position of the second capturing device.

The instructions to trigger restrictive determination may comprise instructions that, when executed by the processor, cause the alignment device to perform the restrictive determination for a plurality of different ways of applying the most restrictive set of geometric restrictions.

The plurality of different ways of applying the set of most restrictive set of geometric restrictions may be mutually exclusive.

The plurality of different ways of applying the most restrictive set of geometric restrictions may overlap.

The alignment device may further comprise instructions that, when executed by the processor, cause the alignment device to: store a result of the restrictive determination in the map.

Each one or the first representation and the second representation may comprise a plurality of 3D segments, each 3D segment comprising centroid coordinates and a descriptor defining extension of the 3D segment around the centroid.

The first set of geometric restrictions and the second set of geometric restrictions may comprise restrictions based on field of view.

The first set of geometric restrictions and the second set of geometric restrictions may comprise restrictions based on a vertical range.

According to a third aspect, it is provided a computer program for aligning representations of a three-dimensional, 3D, space. The computer program comprises computer program code which, when executed on an alignment device causes the alignment device to: obtain a first set of geometric restrictions for a first representation of a 3D physical space, the first set of geometric restrictions corresponding to capturing restrictions of a first capturing device, the first representation forming part of a map for positioning of capturing devices; obtain a second set of geometric restrictions, the second set of geometric restrictions corresponding to capturing restrictions of a second capturing device for providing a second representation of a 3D physical space for positioning the second capturing device using the map; determine that a difference between the first set of geometric restrictions and the second set of geometric restrictions exceeds a threshold amount; determine which one of the first set of geometric restrictions and the second set of geometric restrictions is most restrictive and which one is least restrictive; and trigger a restrictive determination of the representation that is based on the least restrictive set of geometric restrictions, the determination being based on the most restrictive set of geometric restrictions.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1A:
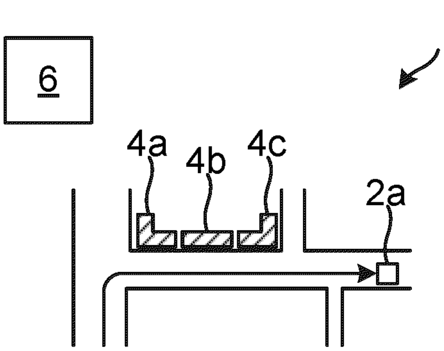
FIGS. 1A-B are schematic diagrams illustrating an environment in which embodiments presented herein can be applied.
Figure 1B:
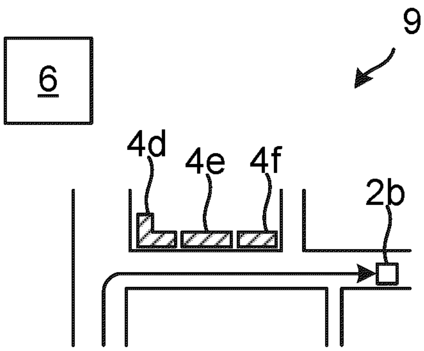

FIGS. 1A-B are schematic diagrams illustrating an environment in which embodiments presented herein can be applied.

Looking first to FIG. 1A, a first capturing device 2*a* is moving in a three-dimensional (3D) space 9, in this example being a street with buildings lining the street. The 3D physical space 9 is here illustrated in a top view. In this example, the first capturing device 2*a* can be implemented in a car. The arrow indicates a direction of movement in the first capturing device 2*a*. A server 6 is provided which can perform certain tasks to reduce processing requirements for the first capturing device 2*a*. The server 6 can be a centralised (cloud) server and/or an edge server. The server 6 can be implemented in a single physical device or using several physical devices, in one or multiple locations.

The first capturing device 2*a* comprises any one or more of a single camera, multiple cameras, a lidar, a radar, etc. In any case, the first capturing device is capable of providing a 3D data structure representing the environment around the first capturing device 2*a*, e.g. as a point cloud or an image with depth data for each pixel. It is to be noted that the server 6 can assist in processing for providing the 3D data structure, e.g. if the first capturing device 2*a* comprises a single camera, used by the server in structure-from-motion, to generate the 3D data structure, or if the first capturing device comprises a pair of cameras which are used by the server to derive the 3D data structure using computer stereo vision. The first capturing device 2*a* can be restricted geometrically in what it can capture from its environment. For instance, the first capturing device 2*a* can be limited in field of view (FOV) and/or vertical range. The FOV is a restriction in terms of directional extension of the capturing ability and can e.g. be expressed in degrees. The vertical range is the vertical extension of capturing ability and can e.g. be expressed in metres.

Based on the 3D data structure provided by the first capturing device 2*a*, a first representation of the physical space 9 is determined. This process can be based on any known or future method. In this example, incremental segmentation is used, resulting in that the first representation of the 3D physical space 9 comprises a first 3D segment 4*a*, a second 3D segment 4*b* and a third 3D segment 4*c*. Each 3D segment 4*a-c* comprises centroid coordinates and a descriptor defining extension of the 3D segment around the centroid. The descriptor is obtained by passing the point cloud of the segment through a neural network, resulting in a data array, i.e. the descriptor.

Looking now to FIG. 1B, a second capturing device 2*b* provides a 3D data structure representing its surrounding environment of the 3D physical space 9. The 3D data structure from the second capturing device is used to obtain a second representation of the 3D physical space 9. Physically, in this example, the 3D physical space 9 of FIG. 1B is the same as the 3D physical space 9 of FIG. 1A. Again, in this example, incremental segmentation is used, resulting in that the second representation of the 3D physical space 9 comprises own set of three 3D segments: a fourth 3D segment 4*d*, a fifth 3D segment 4*e* and a sixth 3D segment 4*f*. The fourth 3D segment 4*d* roughly corresponds to the first 3D segment 4*a*. The fifth 3D segment 4*e* roughly corresponds to the second 3D segment 4*b*. The sixth 3D segment 4*f* roughly corresponds to the third 3D segment 4*c*.

However, the first capturing device 2*a* has a 360-degree FOV, while the second capturing device 2*b* has a 160-degree FOV. Looking to the third 3D segment 4*c* and the sixth 3D segment, it can be seen how the more restrictive geometric restrictions of the second capturing device 2*b* results in different shaped 3D segments. Hence, even though the restrictions of the first capturing device 2*a* are such that more data is obtained, this results in greater discrepancy between the first representation and the second representation.

Consider now a situation where the first representation is used as a map and the second representation is used to position the second capturing device 2*b* within the map. It can be seen how, left unchanged, there are discrepancies between the first representation and the second representation. In a real-world implementation, the effect of different geometric restrictions, resulting in different representations of the 3D physical space, will only be greater.

Figure 2:
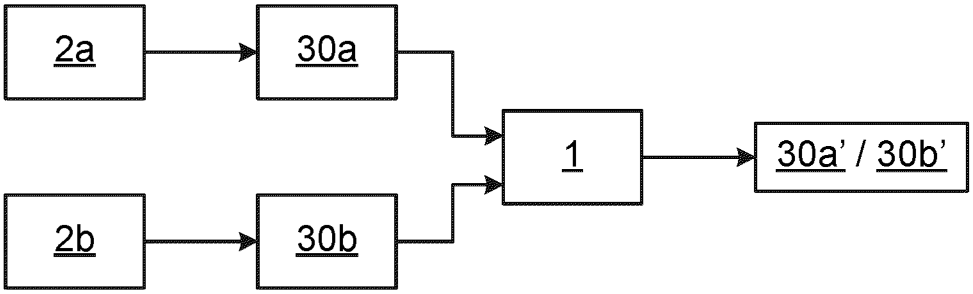
FIG. 2 is a schematic diagram illustrating how representations of 3D space are aligned, according to one embodiment.

FIG. 2 is a schematic diagram illustrating how representations of 3D physical space are aligned according to one embodiment. Here, the first capturing device 2*a* provides a 3D data structure representing its environment which is used to obtain a first representation 30*a* of the 3D physical space. Analogously, the second capturing device 2*b* provides a 3D data structure representing its environment which is used to obtain a second representation 30*b* of the 3D physical space.

According to embodiments presented herein, in order to reduce the discrepancy between representations when different types of capturing devices are used, an alignment device 1 aligns one of the representations 30*a*, 30*b* to the other. This results in either an adjusted first representation 30*a*' or an adjusted second representation 30*b*'. Specifically, the representation of the two representations 30*a*, 30*b* which is based on the less strict geometric restrictions is determined/redetermined in accordance with the more restrictive geometric representation. This reduces the effect illustrated above with reference to FIGS. 1A-B, and greatly improves the chance of correctly positioning of the second capturing device using the map of the first representation.

Figure 3A:
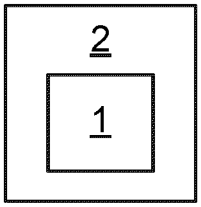
FIGS. 3A-C are schematic diagrams illustrating embodiments of where the alignment device of FIG. 2 can be implemented.
Figure 3B:
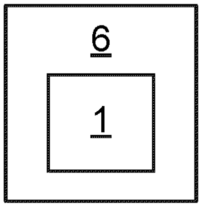
Figure 3C:

FIGS. 3A-C are schematic diagrams illustrating embodiments of where the alignment device of FIG. 2 can be implemented.

In FIG. 3A, the alignment device 1 shown when implemented in the capturing device 2, which can be any of the capturing devices 2*a*, 2*b* of FIGS. 1A-B. The capturing device 2 is thus the host device for the alignment device 1 in this implementation. By performing the matching of geometric restrictions and optionally localisation in the capturing device, latency is reduced compared to when these tasks are performed in the server.

In FIG. 3B, the alignment device 1 shown when implemented in the server 6. The server 6 is thus the host device for the alignment device 1 in this implementation. The matching of geometric restrictions and optionally localisation of the second capturing device is then performed in the server, which has more processing power and is connected to mains power.

In FIG. 3C, the alignment device 1 is shown when implemented as a stand-alone device. The alignment device 1 thus does not have a host device in this implementation. This implementation provides great flexibility in localisation and configuration of the alignment device 1.

Figure 4A:
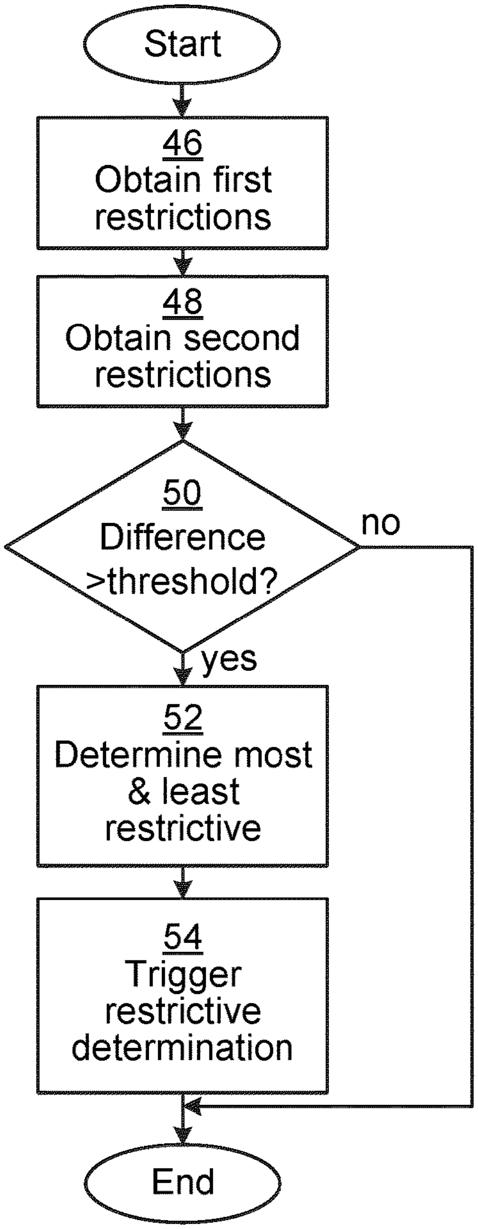
FIGS. 4A-C are flow charts illustrating embodiments of methods for aligning representations of a 3D space.
Figure 4B:
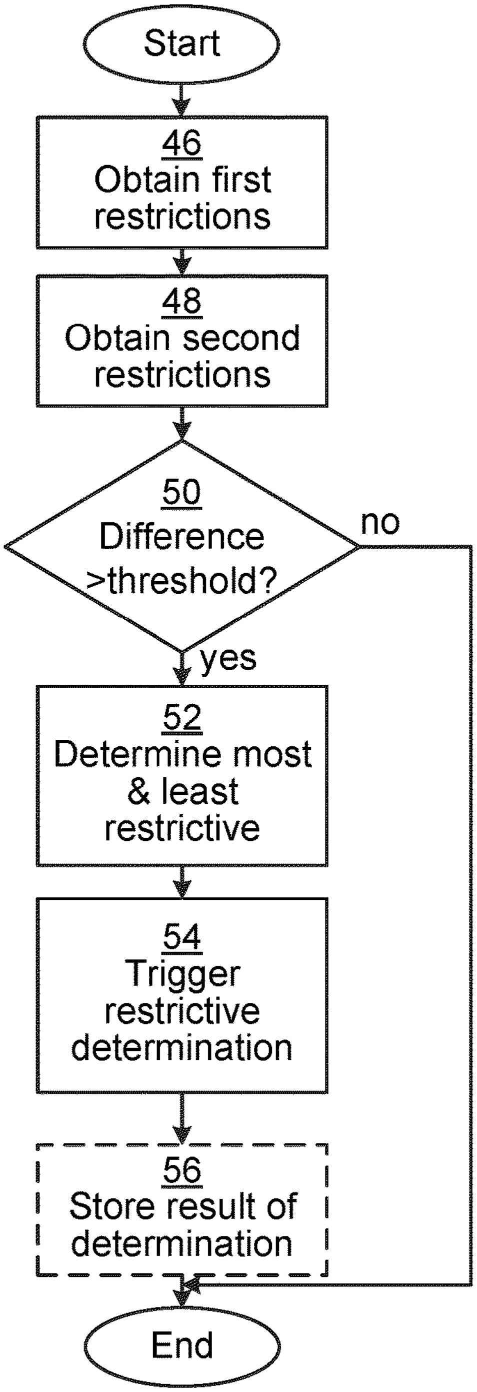
Figure 4C:
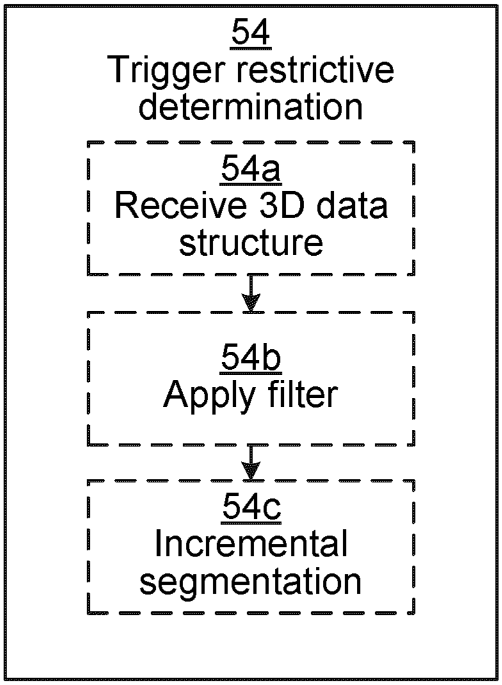

FIGS. 4A-C are flow charts illustrating embodiments of methods for aligning representations of a 3D space. The embodiments of methods are performed in the alignment device. First, the flow chart of FIG. 4A will be described.

In an obtain first restrictions step 46, the alignment device 1 obtains a first set of geometric restrictions for a first representation 30*a* of a 3D physical space 9. The first set of geometric restrictions corresponds to capturing restrictions of a first capturing device 2*a*. The first representation 30*a* forms part of (or is) a map for positioning of capturing devices. It is to be noted that the map can contain components from other capturing devices also, with varying geometric restrictions.

In an obtain second restrictions step 48, the alignment device 1 obtains a second set of geometric restrictions. The second set of geometric restrictions corresponds to capturing restrictions of a second capturing device 2*b*. The second capturing device 2*b* is used for providing a second representation 30*b* of a 3D physical space 9, for positioning the second capturing device 2*b* using the map, as described above.

As explained in more detail above, each one or the first representation and the second representation can comprise a plurality of 3D segments, where each 3D segment comprises centroid coordinates and a descriptor defining extension of the segment around the centroid.

The first set of geometric restrictions and the second set of geometric restrictions can comprise restrictions based on FOV and/or restrictions based on a vertical range and/or general range, i.e. distance from the capturing device. Geometric restrictions of the capturing device can e.g. occur due to physical features of the capturing device such as aperture, lens characteristics, sensor dimensions or sensor arrangement. For instance, one capturing device could have a 60-degree FOV (which is common for monocular or stereo cameras) while another capturing device could have 360-degree FOV (which is common for vehicle lidars).

It is to be noted that step 48 can be performed prior to step 46. In this case, when the map comprises multiple representations associated with respective capturing devices and their geometric restrictions, the first set of geometric restrictions can be selected for a capturing device with geometric restrictions that most closely matches the geometric restrictions of the second capturing device. If multiple capturing devices contributing to the map have the same geometric restrictions, the first set of geometric restrictions can be selected for a capturing device that best matches the first capturing device in other respects, e.g. point cloud density or noise/bias characteristics, which also contributes to better localisation. These parameters are similar for both a mapping capturing device and a localising capturing device. Alternatively, the first set of geometric restrictions (and associated representation) can be selected for a capturing device that contributes with the most data for the map.

In a conditional difference>threshold step 50, the alignment device 1 determines when a difference between the first set of geometric restrictions and the second set of geometric restrictions exceeds a threshold amount, e.g. due to different characteristics of the respective capturing devices. When this is the case, the method proceeds to a determine most & least restrictive step 52. Otherwise, the method ends.

The determination of the difference can be implemented considering the FOV and vertical range values either separately or together. For example, this step could be performed as follows: The difference ratio of both FOV and vertical ranges (VR) are evaluated e.g. $FOV\_ratio=|FOV\_2-FOV\_1|/FOV\_1$, and $VR\_ratio=|VR\_2-VR\_1|/VR\_1$, where '1' indicates association with the first capturing device and '2' indicates association with the second capturing device. If both differences are larger than respective thresholds, this is considered to be significantly negative for the localisation. Alternatively, it is sufficient that a specific one of the differences is greater than a threshold. Alternatively, it is sufficient that either one of the differences is greater than a respective threshold. Alternatively, the differences are weighted and combined, and the combination is compared with a threshold. The selection of how differences are evaluated may be based on real data from real experiments, allowing the best difference evaluation to be selected for a particular application.

In the determine most & least restrictive step 52, the alignment device 1 determines which one of the first set of geometric restrictions and the second set of geometric restrictions is most restrictive and which one is least restrictive.

In a trigger restrictive determination step 54, the alignment device 1 triggers a restrictive determination of the representation, that is based on the least restrictive set of geometric restrictions. The determination is based on the most restrictive set of geometric restrictions. In other words, if the first set of geometric restrictions is the least restrictive, a restrictive determination of the first representation is triggered, where the determination is based on the second set of geometric restrictions (which is the most restrictive). Conversely, if the second set of geometric restrictions is the least restrictive, a restrictive determination of the second representation is triggered, where the determination is based on the first set of geometric restrictions (which is the most restrictive).

The determination is based on a 3D data structure used earlier in the process than the respective representations, i.e. source data for obtaining/determining the respective representations. The 3D data structure can be a point cloud, i.e. a set of points in a 3D space. Alternatively, the 3D data structure can be an image where depth data has been added to each pixel in a 2D image.

This step can comprise performing the restrictive determination within the alignment device, or trigger an external device to perform the restrictive determination.

Optionally, only data, within a 3D data structure, that is within a threshold distance of an estimated position of the second capturing device 2*b* is used for the restrictive determination. Optionally, a direction of movement of the second capturing device is also considered in the threshold distance, such that the threshold distance is greater in the direction of movement of the second capturing devices. This prevents unnecessary processing of data in the 3D data structure that may be completely out of range for localisation of the second capturing device.

The restrictive determination can be performed in a plurality of different ways (e.g. a plurality of different orientations) of applying the most restrictive set of geometric restrictions.

In one embodiment, the plurality of different ways of applying the set of most restrictive set of geometric restrictions can be mutually exclusive. For instance, if the most restrictive FOV is 60 degrees and the least restrictive FOV is 180 degrees, the plurality of different ways can be 0-59 degrees, 60-119 degrees and 120-179 degrees.

Alternatively, the plurality of different ways of applying the most restrictive set of geometric restrictions overlap. For instance, if the most restrictive FOV is 60 degrees and the least restrictive FOV is 180 degrees, the plurality of different ways can be 0-59 degrees, 30-89 degrees, 60-119 degrees, 90-149 degrees, and 120-179 degrees.

This embodiment results in more sets of geometric restrictions than when the mutually exclusive embodiment, but there is a greater chance of better correspondence with one of the sets of geometric restrictions and that of the second capturing device.

Looking now to FIG. 4B, only new or adjusted steps in comparison to FIG. 4A will be described.

In an optional store result of determination step 56, the alignment device 1 stores, in the map, a result of the restrictive determination. In this way, the determination can be reused in the future without having to be determined again, if a new second capturing device enters the 3D physical space for positioning and has the same geometric restrictions.

Looking now to FIG. 4C, this flow chart illustrates optional sub-steps of the trigger restrictive determination step 54.

In an optional receive 3D data structure sub-step 54*a*, the alignment device 1 obtains a 3D data structure corresponding to the least restrictive set of geometric restrictions. The 3D data structure can e.g. be a point cloud or an image containing a 2D image with depth data for each pixel.

In an optional apply filter sub-step 54*b*, the alignment device 1 applies a filter corresponding to the most restrictive set of geometric restrictions to the 3D data structure. For instance, when the most restrictive set of geometric restrictions has a smaller FOV, a filter corresponding to this smaller FOV is applied to the 3D data structure, effectively cropping the 3D data structure.

If vertical range is to be adjusted and the 3D data structure is a point cloud, a box filter can be applied. The minimum and maximum range in x, y and z are then defined as relative distances based on the pose of the second capturing device.

If the FOV is to be adjusted and the 3D data structure is a point cloud, a convex hull filter can be applied. At least four 3D points defining the desired FOV are generated and inserted as defining the convex hull of the desired FOV. The convex hull points are defined as relative points with regard to the pose of the second capturing device, so the filter is created once and can be reapplied whenever required.

In an optional incremental segmentation sub-step 54*c*, the alignment device 1 performs incremental segmentation based on the filtered 3D data structure.

Using embodiments presented herein, the geometric restrictions are matched when the localisation is based on a capturing device with different geometric restrictions than the capturing device used in the mapping. The resulting representations of the 3D physical space match better, which greatly improves localisation in this situation.

Figure 5:
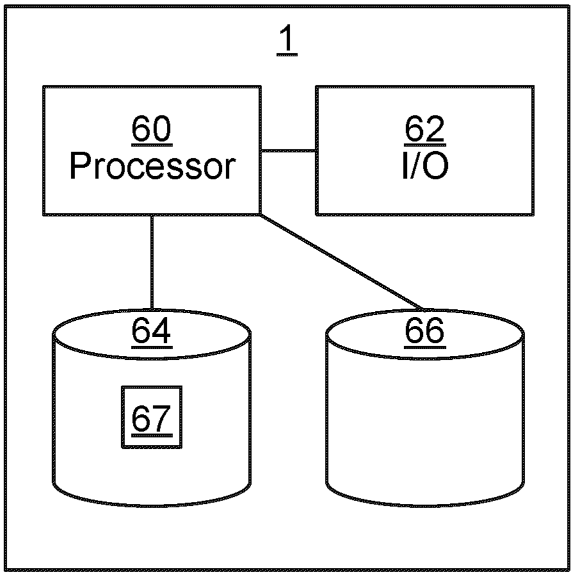
FIG. 5 is a schematic diagram illustrating components of the alignment device of FIGS. 3A-C according to one embodiment.

FIG. 5 is a schematic diagram illustrating components of the alignment device 1 of FIGS. 3A-C according to one embodiment. It is to be noted that one or more of the mentioned components can be shared with the host device, when present. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 4A-C above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The alignment device 1 further comprises an I/O interface 62 for communicating with external and/or internal entities.

Other components of the alignment device 1 are omitted in order not to obscure the concepts presented herein.

Figure 6:
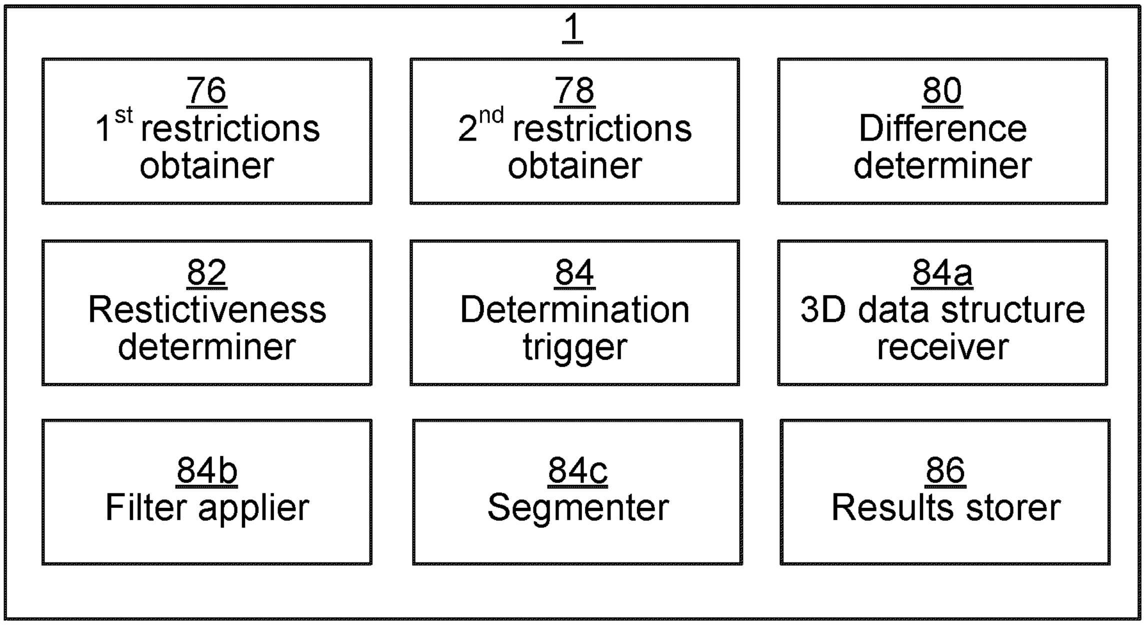
FIG. 6 is a schematic diagram showing functional modules of the alignment device of FIGS. 3A-C according to one embodiment.

FIG. 6 is a schematic diagram showing functional modules of the alignment device 1 of FIGS. 3A-C according to one embodiment. The modules are implemented using software instructions such as a computer program executing in the alignment device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-4C.

A $1^{st}$ restrictions obtainer 76 corresponds to step 46. A $2^{nd}$ restrictions obtainer 78 corresponds to step 48. A difference determiner 80, corresponds to step 50. A restrictiveness determiner 82 corresponds to step 52. A determination trigger 84 corresponds to step 54. A 3D data structure receiver 84*a* corresponds to step 54*a*. A filter applier 84*b* corresponds to step 54*b*. A segmenter 84*c* corresponds to step 54*c*. A results storer 86 corresponds to step 56.

Figure 7:
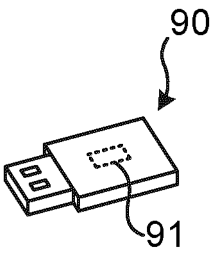
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for aligning representations of a three-dimensional (3D) space, the method being performed in an alignment device and comprising:

obtaining a first set of geometric restrictions for a first representation of a 3D physical space, the first set of geometric restrictions corresponding to capturing restrictions of a first capturing device, the first representation forming part of a map for positioning of capturing devices;

obtaining a second set of geometric restrictions, the second set of geometric restrictions corresponding to capturing restrictions of a second capturing device for providing a second representation of a 3D physical space for positioning the second capturing device using the map;

determining that a difference between the first set of geometric restrictions and the second set of geometric restrictions exceeds a threshold amount;

determining which one of the first set of geometric restrictions and the second set of geometric restrictions is most restrictive and which one is least restrictive; and triggering a restrictive determination of the first representation when the first set of geometric restrictions is determined to be the least restrictive, or of the second representation when the second set of geometric restrictions is determined to be the least restrictive, the determination being based on the most restrictive set of geometric restrictions, wherein triggering the restrictive determination comprises: obtaining a 3D data structure corresponding to the least restrictive set of geometric restrictions; applying a filter corresponding to the most restrictive set of geometric restrictions to the 3D data structure to crop the 3D data structure, wherein the 3D data structure is a point cloud, the most restrictive set of geometric restrictions comprises at least one of a field of view or a vertical range, and the filter is defined relative to a pose of the second capturing device based on the most restrictive set of geometric restrictions; and performing segmentation based on the filtered 3D data structure.

2. The method according to claim 1, wherein performing the segmentation comprises:

performing incremental segmentation based on the filtered 3D data structure.

3. The method according to claim 1, wherein the step of triggering restrictive determination comprises, when the first set of geometric restrictions is determined to be the least restrictive and the second set of geometric restrictions is determined to be the most restrictive, selecting from a plurality of sub-representations of the first representation, a sub-representation that is based on a set of geometric restrictions that most closely matches the second set of geometric restrictions.

4. An alignment device for aligning representations of a three-dimensional (3D) space, the alignment device comprising:

a processor; and a memory storing instructions that, when executed by the processor, cause the alignment device to:

obtain a first set of geometric restrictions for a first representation of a 3D physical space, the first set of geometric restrictions corresponding to capturing restrictions of a first capturing device, the first representation forming part of a map for positioning of capturing devices;

obtain a second set of geometric restrictions, the second set of geometric restrictions corresponding to capturing restrictions of a second capturing device for providing a second representation of a 3D physical space for positioning the second capturing device using the map;

determine that a difference between the first set of geometric restrictions and the second set of geometric restrictions exceeds a threshold amount;

determine which one of the first set of geometric restrictions and the second set of geometric restrictions is most restrictive and which one is least restrictive; and trigger a restrictive determination of the first representation when the first set of geometric restrictions is determined to be the least restrictive, or of the second representation when the second set of geometric restrictions is determined to be the least restrictive, the determination being based on the most restrictive set of geometric restrictions, wherein the instructions to trigger the restrictive determination comprise instructions that, when executed by the processor, cause the alignment device to: obtain a 3D data structure corresponding to the least restrictive set of geometric restrictions; apply a filter corresponding to the most restrictive set of geometric restrictions to the 3D data structure to crop the 3D data structure, wherein the 3D data structure is a point cloud, the most restrictive set of geometric restrictions comprises at least one of a field of view or a vertical range, and the filter is defined relative to a pose of the second capturing device based on the most restrictive set of geometric restrictions; and perform segmentation based on the filtered 3D data structure.

5. The alignment device according to claim 4, wherein the instructions to perform the segmentation comprise instructions that, when executed by the processor, cause the alignment device to:

perform incremental segmentation based on the filtered 3D data structure.

6. The alignment device according to claim 4, wherein the instructions to trigger restrictive determination comprise instructions that, when executed by the processor, cause the alignment device to, when the first set of geometric restrictions is determined to be the least restrictive and the second set of geometric restrictions is determined to be the most restrictive, select from a plurality of sub-representations of the first representation, a sub-representation that is based on a set of geometric restrictions that most closely matches the second set of geometric representations.

7. The alignment device according to claim 4, wherein the instructions to trigger a restrictive determination comprise instructions that, when executed by the processor, cause the alignment device to perform the restrictive determination only for data, within a 3D data structure, that is within a threshold distance of an estimated position of the second capturing device.

8. The alignment device according to claim 4, wherein the instructions to trigger restrictive determination instructions that, when executed by the processor, cause the alignment device to perform the restrictive determination for a plurality of different ways of applying the most restrictive set of geometric restrictions.

9. The alignment device according to claim 8 wherein the plurality of different ways of applying the set of most restrictive set of geometric restrictions are mutually exclusive.

10. The alignment device according to claim 8, wherein the plurality of different ways of applying the most restrictive set of geometric restrictions overlap.

11. The alignment device according to claim 4, further comprising instructions that, when executed by the processor, cause the alignment device to:

store a result of the restrictive determination in the map.

12. The alignment device according to claim 4, wherein each one or the first representation and the second representation comprises a plurality of 3D segments, each 3D segment comprising centroid coordinates and a descriptor defining extension of the 3D segment around the centroid.

13. The alignment device according to claim 4, wherein the first set of geometric restrictions and the second set of geometric restrictions comprise restrictions based on field of view.

14. The alignment device according to claim 4, wherein the first set of geometric restrictions and the second set of geometric restrictions comprise restrictions based on a vertical range.

15. A non-transitory computer readable medium comprising a computer program for aligning representations of a three-dimensional (3D) space, the computer program comprising computer program code which, when executed on an alignment device, causes the alignment device to:

obtain a first set of geometric restrictions for a first representation of a 3D physical space, the first set of geometric restrictions corresponding to capturing restrictions of a first capturing device, the first representation forming part of a map for positioning of capturing devices;

obtain a second set of geometric restrictions, the second set of geometric restrictions corresponding to capturing restrictions of a second capturing device for providing a second representation of a 3D physical space for positioning the second capturing device using the map;

determine that a difference between the first set of geometric restrictions and the second set of geometric restrictions exceeds a threshold amount;

determine which one of the first set of geometric restrictions and the second set of geometric restrictions is most restrictive and which one is least restrictive; and trigger a restrictive determination of the first representation when the first set of geometric restrictions is determined to be the least restrictive, or of the second representation when the second set of geometric restrictions is determined to be the least restrictive, the determination being based on the most restrictive set of geometric restrictions, wherein triggering the restrictive determination comprises: obtaining a 3D data structure corresponding to the least restrictive set of geometric restrictions; applying a filter corresponding to the most restrictive set of geometric restrictions to the 3D data structure to crop the 3D data structure, wherein the 3D data structure is a point cloud, the most restrictive set of geometric restrictions comprises at least one of a field of view or a vertical range, and the filter is defined relative to a pose of the second capturing device based on the most restrictive set of geometric restrictions; and performing segmentation based on the filtered 3D data structure.

* * * * *